(12) United States Patent  (10) Patent No.: US 8,638,657 B1
Gopalakrishnan et al.  (45) Date of Patent: Jan. 28, 2014

(54) DISTRIBUTED SYNCHRONOUS ETHERNET USING A CENTRALIZED CONTROLLER

(75) Inventors: Kamatchi Soundaram Gopalakrishnan, Milpitas, CA (US); Rajagopalan Subbiah, San Jose, CA (US); Prakash Kamath, San Jose, CA (US); Rohit Puri, Sunnyvale, CA (US); Sachchidanand Vaidya, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 337 days.

(21) Appl. No.: 13/081,055

(22) Filed: Apr. 6, 2011

(51) Int. Cl.
*G01R 31/08* (2006.01)
*H04L 12/28* (2006.01)

(52) U.S. Cl.
USPC .......................................... 370/216; 370/419

(58) Field of Classification Search
USPC ......... 370/329, 400, 389, 392, 419, 420, 396, 370/410, 412, 219, 217, 216, 218, 225, 319, 370/344, 341, 431, 413
See application file for complete search history.

(56) References Cited

U.S. PATENT DOCUMENTS

| | | | |
|---|---|---|---|
| 6,717,909 B2 * | 4/2004 | Leroux et al. | 370/228 |
| 7,706,254 B2 * | 4/2010 | Moore et al. | 370/219 |
| 2007/0153811 A1 * | 7/2007 | Venters et al. | 370/395.62 |

* cited by examiner

*Primary Examiner* — Hanh N Nguyen
(74) *Attorney, Agent, or Firm* — Harrity & Harrity, LLP

(57) ABSTRACT

A network device may receive first qualification indicators, for a first signal, from all line cards of the network device. The network device may, in response to the first qualification indicators, transmit instructions to all of the line cards to use the first signal. The network device may further receive second qualification indicators, for a second signal, from all of the line cards. In response to the second qualification indicators, the network device may store information for the second signal in order to use the second signal as a backup signal.

20 Claims, 5 Drawing Sheets

DISTRIBUTED SYNCHRONOUS ETHERNET USING A CENTRALIZED CONTROLLER

BACKGROUND

Cellular phones connect to a cellular mobile network via cell towers. Each cell tower may correspond to a particular coverage area. When a user of a cell phone moves from a first coverage area to a second coverage area, the cell phone needs to seamlessly associate with a cell tower of the second coverage area in order for a phone call not to be dropped. To do so, all of the cell towers associated with the user's cellular service need to operate in the same clock domain. Cell towers operate in the same clock domain when they are synchronized based on a similar frequency (e.g., the cell towers operate at frequencies that are within +/−50 parts per billion (PPB) of each other).

Traditionally, telecommunication networks included time-division multiplexing (TDM) networks that relied on Synchronous Optical Networking and Synchronous Digital Hierarchy (SONET/SDH) technology to carry synchronization information. Currently, cellular mobile networks include next generation networks (NGNs) (e.g., Long Term Evolution (LTE) networks, 3G networks, 4G networks, etc) that utilize a Synchronized Ethernet (SyncE) network to exchange information. Since synchronization (timing/frequency) information is exchanged in a SyncE network via physical timing signals, not packets, the timing signals need to be handled on each hop (e.g., by each router).

A SyncE network may include multiple routers. Each router may include multiple line cards. A router, of a SyncE network, may handle a timing signal by determining that the timing signal is qualified before transmitting the timing signal (information of the timing signal) to a different router. Yet, currently, only a single line card of a router determines that an incoming timing signal is qualified before passing the signal through the other line cards of the router, which do not qualify the signal again, to a different router. Software and/or hardware issues at one of the other line cards may disrupt the signal and cause a change in the frequency. As a result, signals with substantially different frequencies (e.g., frequencies that are not within +/−50 PPB of each other) may be delivered to different cell towers. Consequently, cell phone calls may be dropped when a cell phone moves from a first coverage area to a second coverage area, which is associated with a cell tower that uses a frequency substantially different from the one used by a cell tower associated with the first coverage area.

SUMMARY

According to one aspect, a method may include: receiving, by a device, first qualification indicators, for a first signal, from line cards; determining, by the device, whether a second signal is in use by the line cards; transmitting, by the device, instructions to the line cards to use the first signal when the second signal is not in use by the line cards; receiving, by the device, second qualification indicators, for the second signal, from the line cards; determining, by the device, whether the first signal or any other signal is in use by the line cards; and storing, by the device, information about the second signal, in order to use the second signal as a backup signal, when the first signal or any other signal is in use by the line cards.

According to another aspect, a non-transitory computer-readable medium may store a program for causing a computing device to perform a method. The method may include: receiving first qualification indicators, for a first signal, from all line cards of a network device; determining whether a second signal is in use by the line cards; transmitting instructions to the line cards to use the first signal when the second signal is not in use by the line cards; receiving a failure indicator, for the first signal, from one of the line cards of the network device; and transmitting, in response to the failure indicator and when the first signal is in use by the line cards, new instructions to the line cards for all of the line cards to stop using the first signal.

According to yet another aspect, a network device may include multiple line cards and a centralized controller. The multiple line cards may receive multiple signals. The processor/centralized controller may receive first qualification indicators, for a first signal of the multiple signals, from all of the line cards; transmit, in response to the first qualification indicators, instructions to all of the line cards to use the first signal; receive second qualification indicators, for a second signal of the multiple signals, from all of the line cards; and store, in response to the second qualification indicators, information for the second signal to use the second signal as a backup signal.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
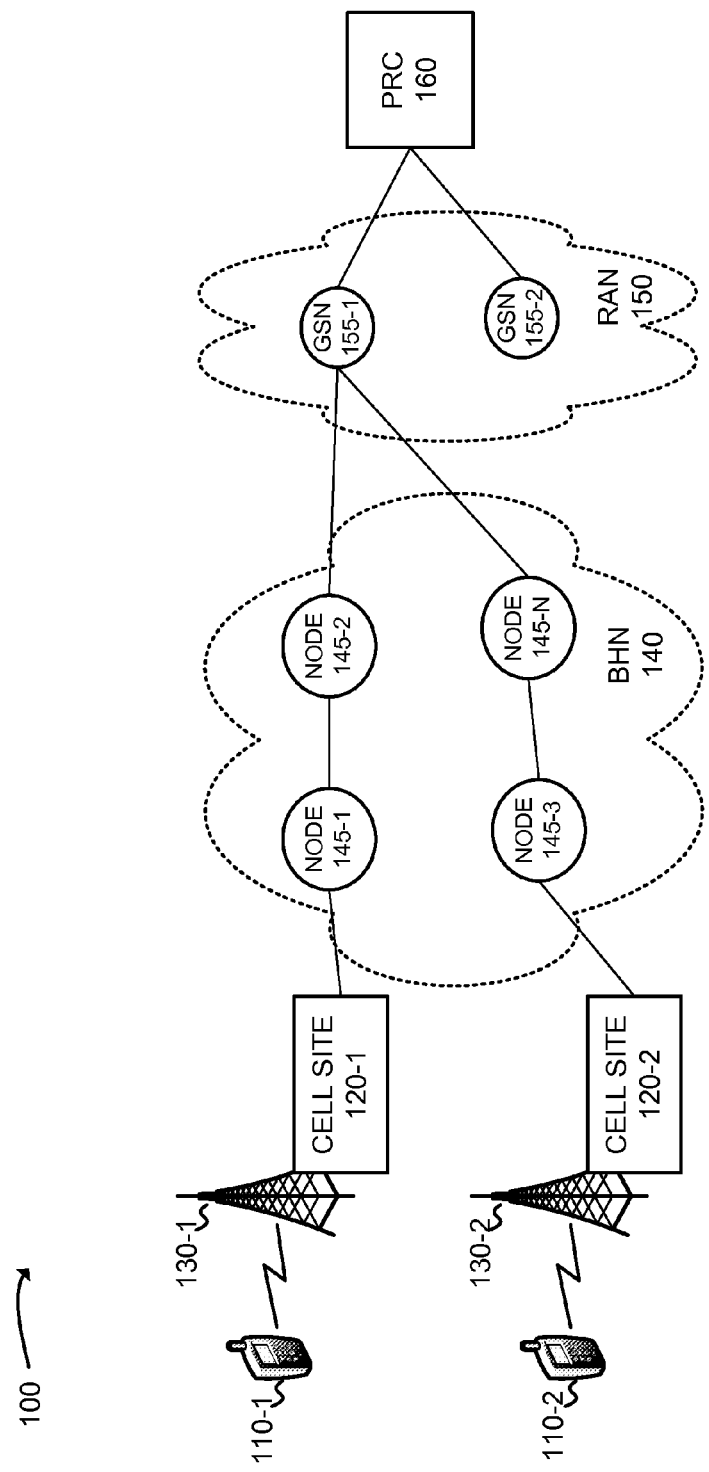
FIG. 1 is a diagram of an example environment in which systems and/or methods described herein may be implemented.

The following detailed description refers to the accompanying drawings. The same reference numbers in different drawings may identify the same or similar elements.

An implementation described herein may provide a distributed synchronous Ethernet using a centralized controller. For example, a primary reference clock (PRC) may generate frequencies to be used by cell towers associated with a particular cellular service provider (e.g., AT&T, Verizon, etc.). The PRC may transmit the frequencies to network devices of a backhaul network, which operates as a Synchronized Ethernet (SyncE) network. The backhaul network may include multiple Ethernet network devices. An Ethernet network device may include two or more line cards. A first line card of the Ethernet network device may receive a primary SyncE signal with a first frequency. A signal may refer to a clock signal. A second line card of the Ethernet network device may receive a secondary SyncE signal with a second frequency. The primary SyncE signal and the secondary SyncE signal may be in the same clock domain (i.e., the first frequency is within a predefined margin of the second frequency).

Each one of the line cards of the Ethernet network device may eventually receive the primary SyncE signal, qualify the primary SyncE signal (after determining that the primary SyncE signal meets predefined criteria), and transmit a qualification indicator for the primary SyncE signal to a centralized controller of the Ethernet network device. After receiving qualification indicators for the primary SyncE signal from all of the line cards of the Ethernet network device, the centralized controller may transmit instructions to all of the line cards to use the primary SyncE signal. The line cards of the Ethernet network device may use the primary SyncE signal by transmitting a frequency of the primary SyncE signal to the cell towers to use the frequency to connect cellular phones to a cellular network.

Furthermore, when one of the line cards of the Ethernet network device eventually receives the secondary SyncE signal, the one of the line cards may qualify the secondary SyncE signal (after determining that the secondary SyncE signal meets the predefined criteria) and transmit a qualification indicator for the secondary SyncE signal to the centralized controller. The centralized controller may receive qualification indicators for the secondary SyncE signal from all of the line cards after receiving the qualification indicators for the primary SyncE signal. In another implementation, the qualification indicators may not be received in any particular order. Since the primary SyncE signal is in use, the centralized controller may determine to use the secondary SyncE signal as a backup signal for the line cards.

Thereafter, one of the line cards of the Ethernet network device may determine that the primary SyncE signal may not be qualified and may transmit a failure indicator for the primary SyncE signal to the centralized controller. In response to the failure indicator, the centralized controller may transmit instructions to all of the line cards to use the secondary SyncE signal instead of the primary SyncE signal.

FIG. 1 is a diagram of an example environment 100 in which systems and/or methods described herein may be implemented. Environment 100 may include one or more of the following elements: user devices 110-1 and 110-2 (collectively referred to as "user devices 110" and individually as "user device 110"), cell sites 120-1 and 120-2 (collectively referred to as "cell sites 120" and individually as "cell site 120"), antennas 130-1 and 130-2 (collectively referred to as "antennas 130" and individually as "antenna 130"), a Backhaul Network (BHN) 140, a Radio Access Network (RAN) 150, and a primary reference clock (PRC) 160. A portion of a cellular network may include cell sites 120, antennas 130, BHN 140, RAN 150, and PRC 160.

Two user devices 110, two cell sites 120, two antennas 130, a single BHN 140, a single RAN 150, and a single PRC 160 have been illustrated in FIG. 1 for simplicity. In practice, environment 100 may include additional, fewer, different, or differently arranged devices/networks than are illustrated in FIG. 1. Alternatively, or additionally, one or more of the devices/networks of environment 100 may perform one or more functions described as being performed by another one or more of the devices/networks of environment 100. Devices of environment 100 may interconnect via wired connections, wireless connections, or a combination of wired and wireless connections.

User device 110 may represent any device capable of transmitting and/or receiving data to/from the cellular network. User device 110 may include any computation or communication device, such as a communication device that is capable of communicating with the cellular network via antennas 130. In one implementation, user device 110 may take the form of a mobile telephone device, a smart phone, a personal digital assistant (PDA), a laptop, a handheld computer, a personal media player, etc. User device 110 may allow a user of user device 110 to communicate via the cellular network with, for example, other user devices 110.

Cell site 120 may represent any device capable of receiving SyncE signals from BHN 140. Cell site 120 may include a radio interface node (e.g., an eNodeB or a base station). Cell site 120 may be associated with a corresponding antenna 130. A cell tower may include antenna 130 and/or cell site 120. Cell site 120 may be connected (e.g., via a wired connection, via an Ethernet interface, via radio network controllers (RNCs), etc.) to one or more other cell sites 120. Cell site 120 may include hardware to communicate with user device 110, via antenna 130, at a particular frequency set based on a received frequency of a SyncE signal. For example, antenna 130-1 and cell site 120-1 may connect one or more user devices 110 (e.g., user device 110-1 and user device 110-2) within a first coverage area to the cellular network. When, for example, user device 110-2 moves to a second coverage area, antenna 130-2 and cell site 120-2 may continue to connect user device 110-2 to the cellular network.

BHN 140 may represent a SyncE network. BHN 140 may include nodes 145-1, 145-2, 145-3, and 145-4 (collectively referred to as "nodes 145" and individually as "node 145"). Only four nodes 145 have been illustrated in FIG. 1 for simplicity. In practice, there may be more nodes 145. Nodes 145 may connect via a number of network links. The network links may include wired links through an Ethernet. Each node 145 may connect to one or more other nodes 145. While FIG. 1 shows a particular number and arrangement of nodes 145, network 140 may include additional, fewer, different, or differently arranged nodes 145 than are illustrated in FIG. 1.

Node 145 may include any network device that transmits signals and/or facilitates transmission of signals to cell sites 120. For example, node 145 may take the form of a routing device (e.g., a router), a switching device, a multiplexing device, or a device that performs a combination of routing, switching, and/or multiplexing functions. In one implementation, node 145 may be a digital device. In another implementation, node 145 may be an optical device. In yet another implementation, node 145 may be a combination of a digital device and an optical device. For example, node 145 may include/represent an Ethernet service router. An Ethernet service router is described below in reference to FIG. 3.

RAN 150 may represent a mobile core network that connects BHN 140 to other (core) portions of the cellular network. BHN 140 may include general packet radio service (GPRS) support nodes (GSNs) 155-1 and 155-2 (collectively referred to as "GSNs 155" and individually as "GSN 155"). Only two GSNs 155 have been illustrated in FIG. 1 for simplicity. In practice, there may be more GSNs 155. GSNs 155 may connect via a number of network links. The network links may include wired and/or wireless links. Each GSN 155 may connect to one or more other GSNs 155. While FIG. 1 shows a particular number and arrangement of GSNs 155, network 140 may include additional, fewer, different, or differently arranged GSNs 155 than are illustrated in FIG. 1.

GSN 155 may include any network device that transmits frequency signals (e.g., SyncE signals) to nodes 145 of BHN 140. PRC 160 may generate the frequency signals (e.g., SyncE signals). In one implementation, each GSN 155 may include PRC 160. In another implementation, PRC 160 may generate and provide frequency signals (e.g., SyncE signals) to one or more GSNs 155. GSN 155 may transmit the frequency signals to one or more nodes 145 of BHN 140. Each GSN 155 may be associated with a particular cellular phone service provider.

Figure 2:
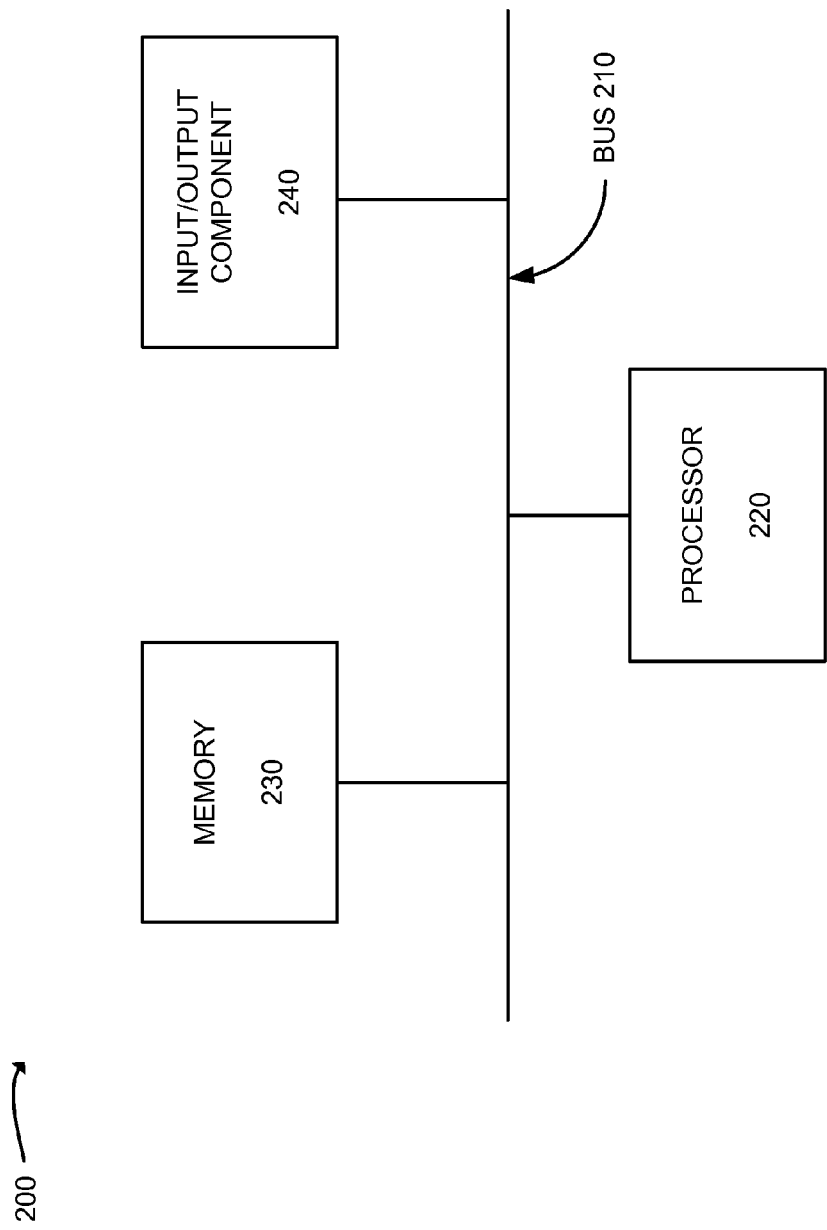
FIG. 2 is a diagram of example components of one or more of the devices of FIG. 1.

FIG. 2 is a diagram of example components of a device 200, which may correspond to user device 110, cell site 120, node 145, GSN 155, and/or PRC 160. Each one of user device 110, cell site 120, node 145, GSN 155, and/or PRC 160 may include one or more devices 200 and/or one or more of each one of the components of device 200. As shown in FIG. 2, device 200 may include a bus 210, a processor 220, a memory 230, and an input/output component 240.

Bus 210 may include a path that permits communication among the components of device 200. Processor 220 may include a processor, a microprocessor, or processing logic (e.g., an application specific integrated circuit (ASIC) or a field programmable gate array (FPGA)) that may interpret and execute instructions. Memory 230 may include a random access memory (RAM) or another type of dynamic storage device that may store information and instructions for execution by processor 220; a read only memory (ROM) or another type of static storage device that may store static information and instructions for use by processor 220; a magnetic and/or optical recording medium and its corresponding drive; and/or a removable form of memory, such as a flash memory.

Input/output component 240 may include a mechanism that permits an operator to input information to device 200, such as a keyboard, a keypad, a mouse, a button, a pen, a touch screen, etc., and/or a mechanism that outputs information to the operator, including a display, a light emitting diode (LED), a speaker, etc. Additionally, or alternatively, input/output component 240 may include any transceiver-like mechanism that enables device 200 to communicate with other devices and/or systems. For example, input/output component 240 may include a wired interface (e.g., an Ethernet interface, an optical interface, etc.), a wireless interface (e.g., a radio frequency (RF) interface, a wireless fidelity (Wi-Fi) interface, a Bluetooth interface, etc.), or a combination of a wired interface and a wireless interface.

As will be described in detail below, device 200 may perform certain operations. Device 200 may perform these and other operations in response to processor 220 executing software instructions (e.g., computer program(s)) contained in a computer-readable medium, such as memory 230, a secondary storage device (e.g., hard disk, CD-ROM, etc.), etc. A computer-readable medium may be defined as a non-transitory memory device. A memory device may include a space within a single physical memory device or spread across multiple physical memory devices. The software instructions may be read into memory 230 from another computer-readable medium or from input/output component 240. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 illustrates example components of device 200, in other implementations, device 200 may include additional components, fewer components, different components, or differently arranged components than those illustrated in FIG. 2 and described herein. Alternatively, or additionally, one or more components of device 200 may perform one or more other tasks described as being performed by one or more other components of device 200.

Figure 3:
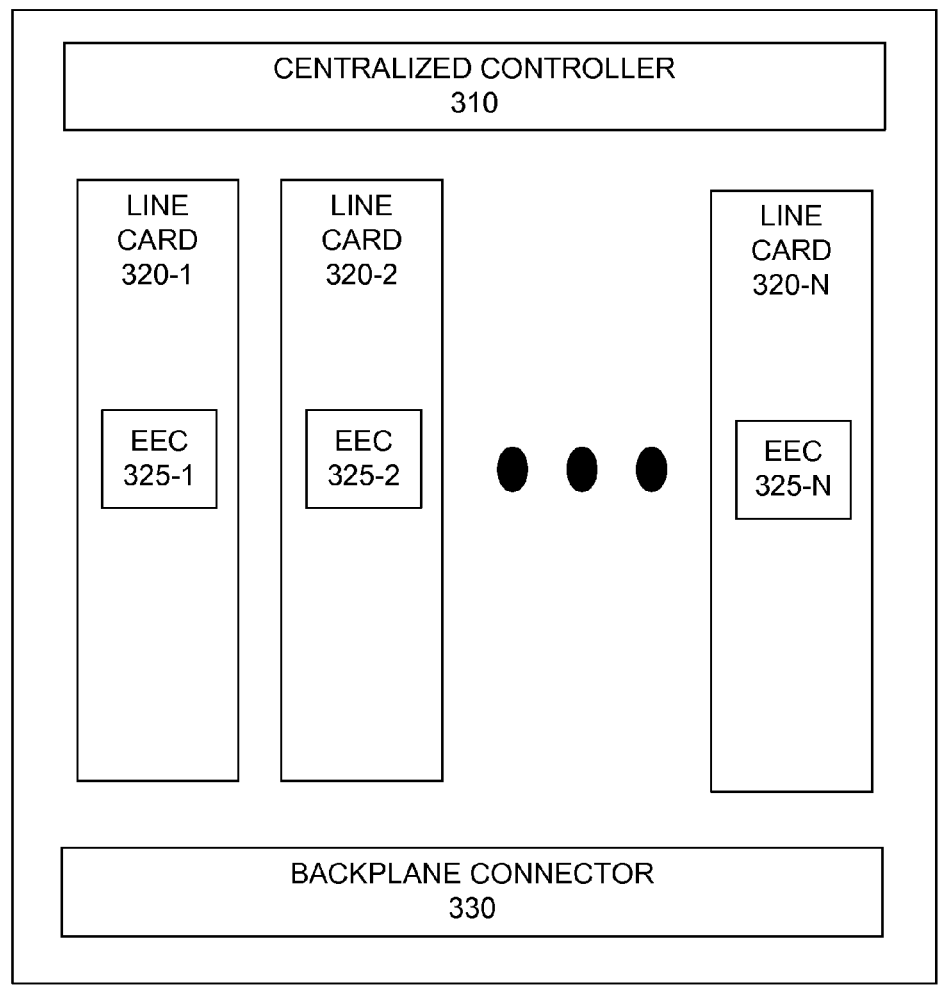
FIG. 3 is a diagram of an example Ethernet service router.

FIG. 3 is a diagram of an example network device, such as an Ethernet service router 300 (herein, router 300). Node 145 (of FIG. 1) may include router 300. Router 300 may include a centralized controller 310, line cards 320-1, 320-2, ..., 320-N (collectively referred to as "line cards 320" and individually as "line card 320"), and backplane connector 330. In one implementation, one or more of the functions described in connection with FIG. 3 may be implemented by one or more of the example components of device 200 (FIG. 2).

Centralized controller 310 may include one or more components that determine and control which SyncE signal is used by line cards 320 of router 300. Centralized controller 310 may execute an application that polls corresponding client applications, that execute on line cards 320, for information (e.g., qualification indicators or failure indicators) associated with SyncE signals. Centralized controller 310 may receive the information from line cards 320. In response to the information, centralized controller 310 may transmit instructions, to the client applications of line cards 320, that specify which SyncE signal should be used by line cards 320.

Each line card 320 may include one of Electronic Equipment Clocks (EECs) 325-1, 325-2, ..., 325-N (collectively referred to as "EECs 325" and individually as "EEC 325"). Line card 320 may also include input/output ports, a processor, and/or one or more other components (not shown in FIG. 3). Line card 320 may receive a SyncE signal via one of its input/output ports. EEC 325 of line card 320 may determine whether the SyncE signal complies with predefined criteria. EEC 325 may generate and transmit a qualification indicator, to centralized controller 310, when the SyncE signal complies with the predefined criteria. EEC 325 may generate and transmit a failure indicator, to centralized controller 310, when the SyncE signal does not comply with the predefined criteria. Line card 320 may transmit the SyncE signal, out of one of the input/output ports, to other line cards 320 via backplane connector 330. Line card 320 may receive instructions to use a particular SyncE signal. Line card 320 may use the particular SyncE signal by transmitting a frequency of the particular SyncE signal to one or more cell sites 120 (FIG. 1) or to the next network device 300 that is closer to cell sites 120, associated with line card 320.

Backplane connector 330 may represent a portion of router 300 that facilitates transmission of SyncE signals between line cards 320. Backplane connector 330 may include a FPGA and one or more other components that may facilitate transmission of the SyncE signals. For example, backplane connector 330 may receive a primary SyncE signal from line card 320-1 and may transmit the primary SyncE signal to all other line cards 320 (i.e., all line cards 320 except line card 320-1). Simultaneously or at a different time, backplane connector 330 may receive a secondary SyncE signal from line card 320-2 and may transmit the secondary SyncE signal to all other line cards 320 (i.e., all line cards 320 except line card 320-2).

Although FIG. 3 illustrates example components of router 300, in other implementations, router 300 may include additional, fewer, different, or differently arranged components than are illustrated in FIG. 3. Alternatively, or additionally, one or more of the components of router 300 may perform one or more functions described as being performed by another one or more of the components of router 300. For example, one of line cards 320 may perform functions of centralized controller 310 and/or functions of backplane connector 330.

Figure 4:
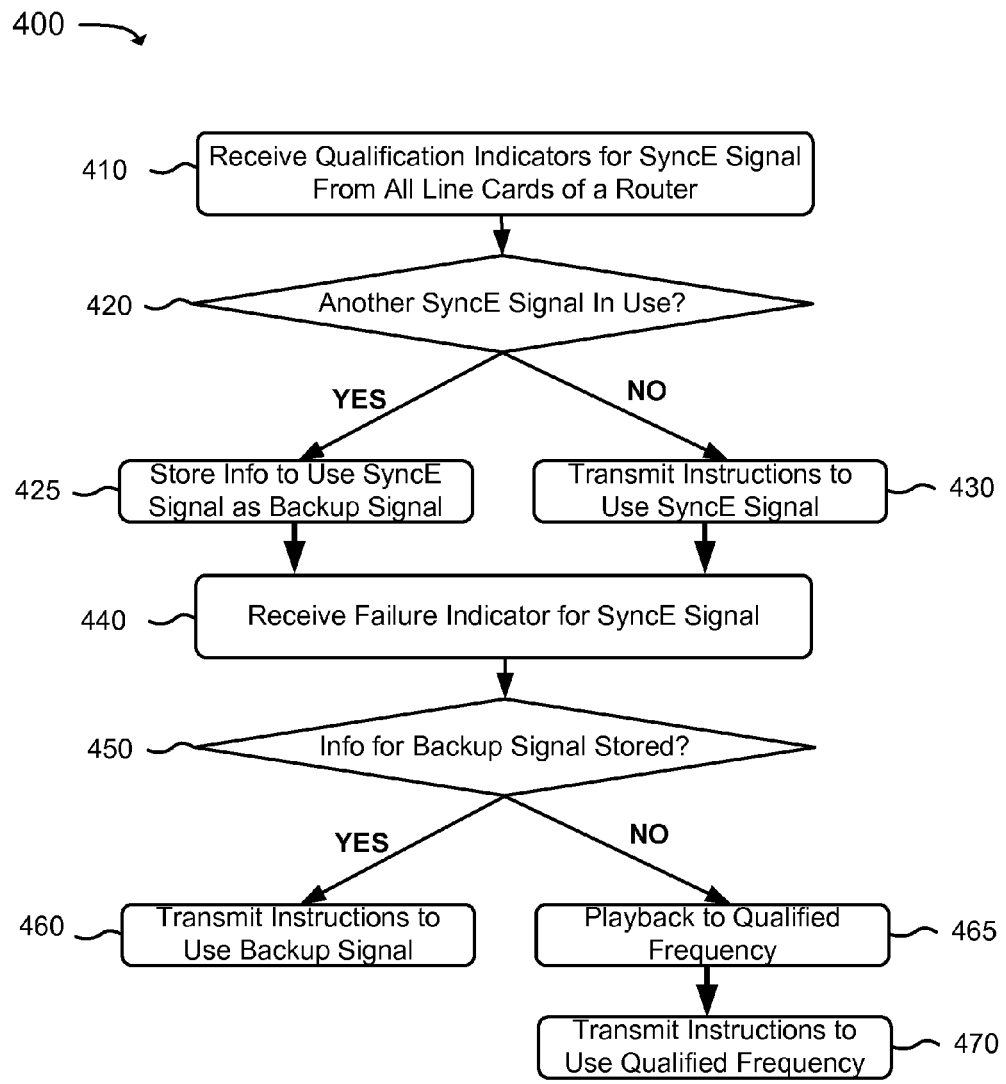
FIG. 4 is a flowchart of an example process for providing a distributed synchronous Ethernet using a centralized controller.

FIG. 4 is a flowchart of an example process 400 for providing a distributed synchronous Ethernet using a centralized controller. Process 400 is described below in reference to FIG. 3. In one implementation, centralized controller 310 may perform process 400. Alternatively, process 400 may be performed by one or more other devices, alone or in combination with centralized controller 310.

As illustrated in FIG. 4, process 400 may include receiving qualification indicators for a SyncE signal from all line cards of a router (block 410). For example, line card 320-1 of router 300 may receive a SyncE signal from an external source (e.g., GSN 155 or from router 300 of another node 145). The received SyncE signal may include a frequency. EEC 325-1 of line card 320-1 may determine whether the received SyncE signal complies with predefined criteria. To do so, EEC 325-1 may calculate a difference between a value of the frequency, of the received SyncE signal, and a value previously received for the frequency. The predefined criteria may require, for example, that the difference be less than a predefined error limit (e.g., +/−4.2 parts per million (PPM)). If EEC 325-1 determines that the received SyncE signal complies with the predefined criteria, line card 320-1 may generate a qualification indicator for the received SyncE signal. Line card 320-1 may transmit the qualification indicator to centralized controller 310.

Line card 320-1 may also transmit, via backplane connector 330, the received SyncE signal to all other line cards 320 of router 300. Each EEC 325 of each one of the other line cards 320 may also determine whether the received SyncE signal complies with the predefined criteria. If all of the EECs 325 determine that the received SyncE signal complies with the predefined criteria, each one of the other line cards 320 may also generate a qualification indicator for the received SyncE signal. The other line cards 320 may transmit the generated qualification indicators, for the received SyncE signal, to centralized controller 310.

For example, router 300 may include line cards 320-1, 320-2, and 320-3. As discussed above, line card 320-1 may receive a SyncE signal and determine that the received SyncE signal complies with the predefined criteria. Line card 320-1 may transmit the received SyncE signal to line card 320-2 and line card 320-3. Line card 320-2 may determine that the received SyncE signal, as received by line card 320-2, meets the predefined criteria. Line card 320-3 may also determine that the received SyncE signal, as received by line card 320-3, meets the predefined criteria. Accordingly, line cards 320-1, 320-2, and 320-3 may transmit qualification indicators for the SyncE signal to centralized controller 310. Centralized controller 310 may receive the qualification indicators, for the received SyncE signal, from all line cards 320 of router 300.

Process 400 may further include determining whether another SyncE signal is already in use (block 420). For example, after receiving the qualification indicators for the received SyncE signal, centralized controller 310 may determine whether centralized controller 310 has instructed line cards 320 to use a frequency of another (primary) SyncE signal. If so, the frequency of the other SyncE signal will be in use as long as a failure indicator is not received, by centralized controller, for the other SyncE signal from one of line cards 320.

If another SyncE signal is in use (block 420—YES), process 400 may include storing information about a received SyncE signal to use the received SyncE signal as a backup signal (block 425). For example, after determining that the other SyncE signal is in use by line cards 320, centralized controller 310 may store information about the received SyncE signal to use the received SyncE signal as a backup signal, at a later point in time, instead of the other SyncE signal. The information may include a reference for the received SyncE signal.

If another SyncE signal is not in use (i.e., there is no SyncE signal in use) (block 420—NO), process 400 may include transmitting instructions to use the received SyncE signal (block 430). For example, centralized controller 310 may determine that line cards 320 of router 300 are not using any SyncE signal. In response to the determination, centralized controller 310 may generate and transmit instructions, to all line cards 320 of router 310, to use the received SyncE signal.

Line cards 320 may use the received SyncE signal by transmitting the received SyncE signal and/or a frequency of the received SyncE signal to cell sites 120 (FIG. 1). Cell sites 120 may set antennas 130 to operate at the frequency of the received SyncE signal.

As further shown in FIG. 4, process 400 may include receiving a failure indicator for a SyncE signal (block 440). For example, while line cards 320 are using a SyncE signal, EEC 325-2 of line card 320-2 may determine that the SyncE signal being used does not (e.g., no longer) complies with the predefined criteria (e.g., a shift in values of the frequency of the received signal (i.e., the calculated difference) is greater than +/−4.2 PPM). In response to the determination, line card 320-2 may transmit a failure indicator for the SyncE signal to centralized controller 310. In another example, line card 320 may determine that a SyncE signal, for which information is stored in order to use the SyncE signal as a backup signal, no longer complies with the predefined criteria. In response, line card 320 may transmit a failure indicator for the backup signal to centralized controller 310. Centralized controller 310 may, after receiving the failure indicator, stop storing the information (e.g, remove information) necessary to use the SyncE signal as the backup signal.

Process 400 may also include determining whether information for a backup signal is stored (block 450). For example, after receiving, from line card 320-2, a failure indicator for a SyncE signal that is in use, centralized controller 310 may determine that none of line cards 320 may continue to use the SyncE signal. Centralized controller 310 may transmit instructions to line cards 320 to discontinue using the SyncE signal. In one example, the instructions may be sent as part of instructions described below in reference to blocks 460-470. Thereafter, centralized controller 310 may determine whether information is stored for/about another SyncE signal that may be used as a backup signal.

If information for a backup signal is stored (block 450—YES), process 400 may include transmitting instructions to use the backup signal (block 460). For example, centralized controller 310 may have previously stored information for a received SyncE signal to use the received SyncE signal as a backup signal (block 425). If, thereafter, the backup signal was not used and centralized controller 310 did not receive a failure indicator for the backup signal, centralized controller 310 may still store the information for the backup signal. When the information for the backup signal is stored, centralized controller 310 may transmit instructions for all line cards 320 to use the backup signal instead of a SyncE signal that was previously being used and for which centralized controller 310 received a failure indicator from one of line cards 320 (block 440).

If information for a backup signal is not stored (block 450—NO), process 400 may include playing back to a qualified frequency (block 465) and transmitting instructions to use the qualified frequency (block 470). Playing back to the qualified frequency may include retrieving a frequency of a SyncE signal that was previously qualified by all line cards 320 of router 300. In one example, centralized controller 310 may receive qualification indicators for a primary SyncE signal from all of line cards 320 and may instruct line cards 320 to use the primary SyncE signal. Thereafter, centralized controller 310 may not receive qualification indicators from all of line cards 320 for any other SyncE signal. As a result, when centralized controller 310 receives a failure indicator from one of line cards 320 for the primary SyncE signal, centralized controller 310 may not store information for a backup signal at a time when the failure indicator is received for the primary SyncE signal that is in use.

In another example, centralized controller 310 may store information for a backup signal (block 425). The information for the backup signal may include a reference for the backup signal. Thereafter, centralized controller 310 may receive a failure indicator, from one of line cards 320, for a SyncE signal that is in use. In response, centralized controller 310 may transmit instructions to use the backup signal (block 430). Afterwards, centralized controller 310 may not receive qualification indicators from all of line cards 320 of router 300 for any other SyncE signal and receive a failure indicator from one of line cards 320 for the backup signal now being used. Accordingly, centralized controller 310 may no longer store reference information for a backup signal at a time when the failure indicator is received for the SyncE signal that is in use.

In one implementation, when no information for a backup signal is stored, centralized controller 310 may determine a qualified frequency of a last SyncE signal for which the centralized controller 310 received qualification indicators from all of line cards 320. Centralized controller 310 may generate instructions for line cards 320 to use the qualified frequency. Centralized controller 310 may transmit the instructions to line cards 320. In another implementation, centralized controller 310 may transmit instructions for line cards 320 to utilize a previously used qualified frequency of a qualified SyncE signal. In response to the instructions, for example, line card 320-1 may determine a last qualified frequency which line card 320-1 used to synchronize cell sites 120 (FIG. 1).

Line cards 320 may continue to use the qualified frequency/frequencies until centralized controller 310 receives qualification indicators from all of line cards 320 for any SyncE signal (block 410). At that point, centralized controller 310 may transmit instructions, to all of line cards 320, to use a frequency of the SyncE signal.

Figure 5:
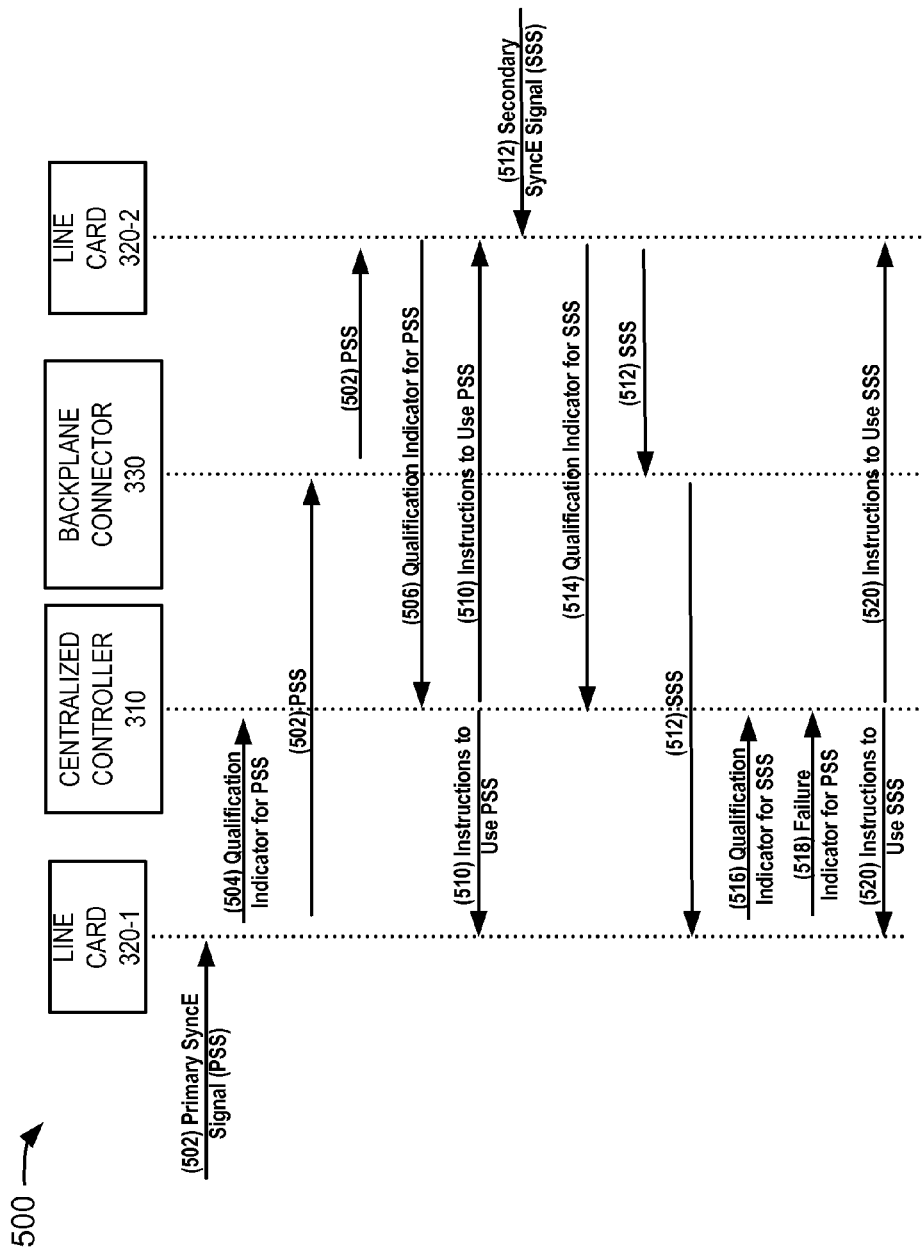
FIG. 5 is a flow diagram for an example of providing distributed synchronous Ethernet using a centralized controller.

FIG. 5 is a flow diagram 500 for an example of providing distributed synchronous Ethernet using a centralized controller. Assume, for simplicity of the example, that router 300 includes only two line cards 320, line card 320-1 and line card 320-2.

As shown in FIG. 5, line card 320-1 may receive a primary SyncE signal (PSS) 502 from a PSS source outside of router 300 (e.g., GSN 155, another node 145, or PRC 160 of FIG. 1). Line card 320-1 may determine whether PSS 502 meets predefined criteria. If line card 320-1 determines that PSS 502 meets the predefined criteria, line card 320-1 may transmit a qualification indicator 504 for PSS 502 to centralized controller 310. Line card 320-1 may also transmit PSS 502 to backplane connector 330. Backplane connector 330 may forward PSS 502 to line card 320-2. Line card 320-2 may receive PSS 502 from backplane connector 330. Line card 320-2 may determine whether PSS 502 meets the predefined criteria. If line card 320-2 determines that PSS 502 meets the predefined criteria, line card 320-2 may transmit a qualification indicator 506 for PSS 502 to centralized controller 310.

Centralized controller 310 may determine that centralized controller received qualification indicators from all of line cards 320, of router 300, for PSS 502, in the form of qualification indicator 504 for PSS 502, from line card 320-1, and qualification indicator 506 for PSS 502, from line card 320-2. Centralized controller 310 may further determine that no other SyncE signal is currently being used by line cards 320. In response to the determination, centralized controller 310 may transmit instructions 510 to use PSS 502 to line card 320-1 and to line card 320-2. In response to instructions 510, line card 320-1 and line card 320-2 may derive the frequency/clock from PSS 502 (e.g., by using EEC 325-1 and EEC 325-2, respectively). Line card 320-1 and line card 320-2 may transmit the derived frequency of PSS 502 to one or more cell sites 120, or to a different network device 145, through their Ethernet ports. Cell sites 120 may operate corresponding antennas 130 at the frequency of PSS 502.

Line card 320-2 may also receive a secondary SyncE signal (SSS) 512 from a SSS source outside of router 300. In one implementation, the SSS source may be a different device than the PSS source. The PSS source and the SSS source may operate in the same clock domain. In another implementation, a single device (or a group of devices) may act as the PSS source and the SSS source and, accordingly, provide both PSS 502 and SSS 512 to router 300. Line card 320-2 may determine whether SSS 512 meets the predefined criteria. If line card 320-2 determines that SSS 512 meets the predefined criteria, line card 320-2 may transmit a qualification indicator 514 for SSS 512 to centralized controller 310. Line card 320-2 may also transmit SSS 512 to backplane connector 330. Backplane connector 330 may forward SSS 512 to line card 320-1. Line card 320-1 may receive SSS 512 from backplane connector 330. Line card 320-1 may determine whether SSS 512 meets the predefined criteria. If line card 320-1 determines that SSS 512 meets the predefined criteria, line card 320-1 may transmit a qualification indicator 516 for SSS 512 to centralized controller 310.

Centralized controller 310 may determine that centralized controller 310 received qualification indicators from all of line cards 320, of router 300, for SSS 512, in the form of qualification indicator 514 for SSS 511, from line card 320-1, and qualification indicator 516 for SSS 512, from line card 320-1. Centralized controller 310 may further determine that PSS 502 is currently being used by line cards 320. In response, centralized controller 310 may store reference information for SSS 512 so that SSS 512 may be used as a backup signal.

Thereafter, for example, line card 320-1 may determine that PSS 502 no longer meets the predefined criteria. Accordingly, line card 320-1 may transmit a failure indicator 518 for PSS 502 to centralized controller 310. In response to failure indicator 518, centralized controller 310 may determine that line cards 320 may no longer use PSS 502 and that reference information is stored to use SSS 512 as the backup signal. Centralized controller 310 may transmit instructions 520 to use SSS 512 to line card 320-1 and to line card 320-2. In response to instructions 520, line card 320-1 and line card 320-2 may transmit a frequency of SSS 512 to one or more cell sites 120, or to a different node 145 that is closer to cell site 120, through their Ethernet ports. Cell sites 120 may operate corresponding antennas 130 at the frequency of SSS 512.

In another implementation, line card 320-1, for example, may receive both PSS 502 from the PSS source and SSS 512 from the SSS source. In this implementation, line card 320-2 may receive PSS 502 and SSS 512 from line card 320-1 via backplane connector 330. In yet another implementation, line cards 320 of router 300 may receive more than two different SyncE signals. In yet another implementation, a single line card (e.g., line card 320-1 or 320-2) may receive both PSS 502 and SSS 512.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 4, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a device, qualification indicators, for a first signal, from line cards of the device;
    determining, by the device, whether a frequency of a second signal is in use by the line cards;
    transmitting, by the device and after receiving the qualification indicators, instructions to the line cards to use a frequency of the first signal when the frequency of the second signal is not in use by the line cards;
    receiving, by the device, a failure indicator, for the first signal, from one of the line cards;
    determining, by the device, whether information about the second signal is stored; and
    transmitting, after receiving the failure indicator and when the information about the second signal is not stored, new instructions to the line cards that instruct the line cards to use a qualified frequency previously used by the line cards instead of the frequency of the first signal.

2. The method of claim 1,
    where the first signal and the second signal are Synchronized Ethernet (SyncE) signals,
    and
    where the second signal comprises a another frequency that is different from the frequency of the first signal.

3. The method of claim 1, where determining whether the frequency of the second signal is in use by the line cards comprises:
    determining whether the frequency of the second signal is being transmitted by the line cards to one or more antennas of a cellular network.

4. The method of claim 1, further comprising:
    beginning a storage of the information about the second signal;
    receiving another failure indicator, for the second signal, from one of the line cards;
    ending, based on the other failure indicator, the storage of the information about the second signal,
        the information including a reference for the second signal.

5. The method of claim 1, where the line cards comprise all of the line cards of the device.

6. The method of claim 1, further comprising:
    storing information about the first signal when the frequency of the second signal is in use by the line cards at a time of receiving the qualification indicators; and
    receiving other qualification indicators, for the second signal, from the line cards; and
    transmitting instructions that instruct the line cards to use the frequency of the second signal when neither the frequency of the first signal nor a frequency of any another signal is in use by the line cards at a time of receiving the other qualification indicators.

7. The method of claim 1, further comprising:
    transmitting, after receiving the failure indicator and when the information about the second signal is stored, other new instructions to the line cards that instruct the line cards to use the frequency of the second signal instead of the frequency of the first signal.

8. The method of claim 1, where the failure indicator indicates that the frequency of the first signal being used by the one of the line cards does not comply with a particular criteria.

9. A non-transitory computer-readable medium storing instructions, the instructions comprising:
    one or more instructions that, when executed by at least one processor, cause the at least one processor to:
        receive qualification indicators, for a first signal, from line cards of a network device;
        determine whether a frequency of a second signal is in use by the line cards;
        transmit instructions to the line cards to use a frequency of the first signal when the frequency of the second signal is not in use by the line cards;
        receive a failure indicator, for the first signal, from one of the line cards of the network device;
        determine, after receiving the failure indicator, whether information is stored to use the second signal as a backup signal;
        determine a qualified frequency of a previously used signal when no information is stored for the backup signal,
            the previously used signal being the first signal or another signal previously used by the line cards; and
        transmit new instructions to the line cards that instruct the line cards to stop using the frequency of the first signal and to use the qualified frequency.

10. The non-transitory computer-readable medium of claim 9, where the instructions further comprise:
    store information about the first signal when the frequency of the second signal is in use by the line cards at a time of receiving the qualification indicators.

11. The non-transitory computer-readable medium of claim 9, where the instructions further comprise:
    one or more instructions that, when executed by the at least one processor, cause the at least one processor to:
        receive other qualification indicators, for the second signal, from all of the line cards;
        determine whether the frequency of the first signal or a frequency of any other signal is in use by the line cards; and store information about the second signal when the frequency of the first signal or the frequency of the any other signal is in use by the line cards.

12. The non-transitory computer-readable medium of claim 9,
where the first signal is a SyncE signal, and
where the first signal comprises a frequency originally generated by a primary reference clock of a cellular network.

13. The non-transitory computer-readable medium of claim 9, where the one or more instructions to determine whether the frequency of the second signal in use by the line cards comprise:
one or more instructions that, when executed by the at least one processor, cause the at least one processor to:
determine whether the frequency of the second signal in use by the line cards based on whether the line cards have been instructed to use the frequency of the second signal.

14. A network device comprising:
line cards to receive multiple signals; and
a centralized controller to:
receive, from the line cards, first qualification indicators for a first signal of the multiple signals,
transmit, based on the first qualification indicators and to the line cards, instructions to use a frequency of the first signal,
receive, from the line cards, second qualification indicators, for a second signal of the multiple signals, and
store, based on the second qualification indicators, information for the second signal in order to use the second signal as a backup signal,
the line cards not using the second signal before the centralized controller receives the first qualification indicators.

15. The network device of claim 14, where the centralized controller is further to:
receive a failure indicator, for the first signal, from one of the line cards, and
transmit, based on the failure indicator, new instructions to all of the line cards to use a frequency of the second signal instead of the frequency of the first signal.

16. The network device of claim 14,
where a first line card of the line cards is to:
receive the first signal from a first signal source outside the network device, and
where the first line card or a second line card of the line cards is to:
receive the second signal from a second signal source outside the network device.

17. The network device of claim 16,
where a different network device acts as one or more of the first signal source or the second signal source, and
where the different network device is an Ethernet service router or a part of a general packet radio service (GPRS) support node (GSN).

18. The network device of claim 14, further comprising:
a backplane connector to transmit the multiple signals between the line cards.

19. The network device of claim 14, where the line cards are further to:
transmit, after receiving the instructions to use the frequency of the first signal, the frequency of the first signal to one or more cell sites.

20. The network device of claim 14, where a particular line card, of the line cards, is to:
receive the first signal from a signal source,
determine that the first signal complies with particular criteria,
generate a particular qualification indicator, of the first qualification indicators, based on determining that the first signal complies with the particular criteria, and
transmit the particular qualification indicator to the centralized controller.

\* \* \* \* \*

UNITED STATES PATENT AND TRADEMARK OFFICE
CERTIFICATE OF CORRECTION

PATENT NO. : 8,638,657 B1
APPLICATION NO. : 13/081055
DATED : January 28, 2014
INVENTOR(S) : Kamachi Soundaram Gopalakrishnan et al.

It is certified that error appears in the above-identified patent and that said Letters Patent is hereby corrected as shown below:

In the Claims

Please correct Claim 14 (Column 13, Lines 29 and 30) to read as follows:

receive, from the line cards, second qualification indicators for a second signal of the multiple signals, and Signed and Sealed this
Fifteenth Day of July, 2014

Michelle K. Lee
*Deputy Director of the United States Patent and Trademark Office*